No. 650,417. Patented May 29, 1900.
D. P. PERRY.
PORTABLE STORAGE BATTERY CELL AND CONTAINING CASE THEREFOR.
(Application filed Apr. 28, 1899.)
(No Model.) 2 Sheets—Sheet 1.
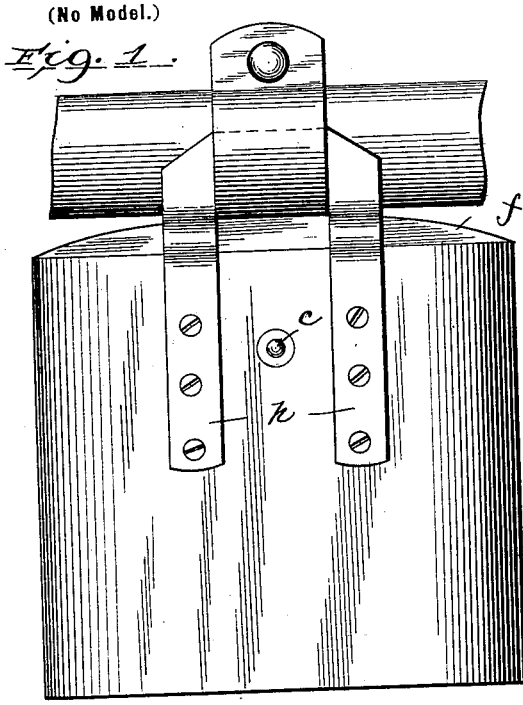
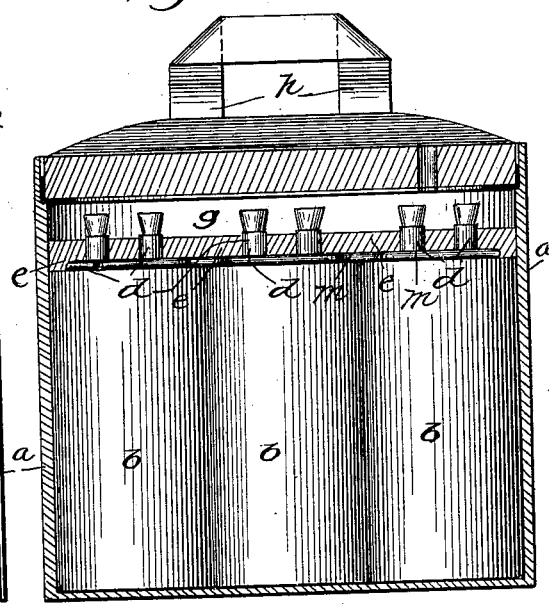
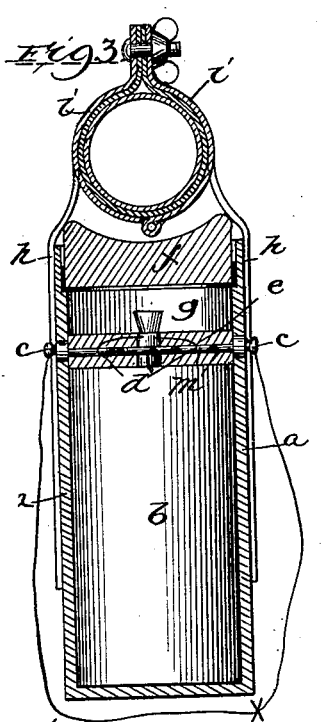
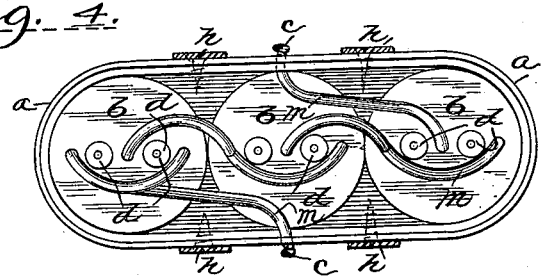
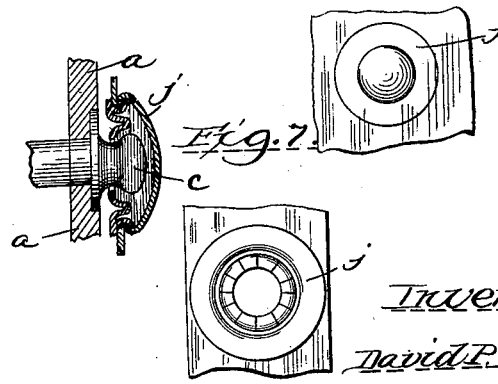
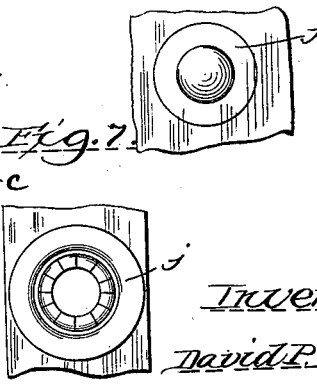
Inventor:
David P. Perry,
By Charles A. Brown & Cragg
Attorneys.
Witnesses:
Harry B. White.
R. White.

No. 650,417. Patented May 29, 1900.
D. P. PERRY.
PORTABLE STORAGE BATTERY CELL AND CONTAINING CASE THEREFOR.
(Application filed Apr. 28, 1899.)
(No Model.) 2 Sheets—Sheet 2.
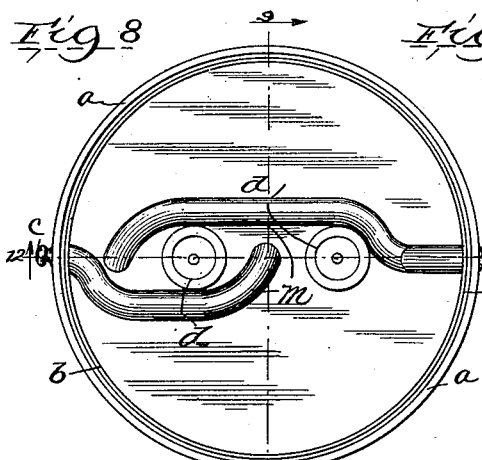
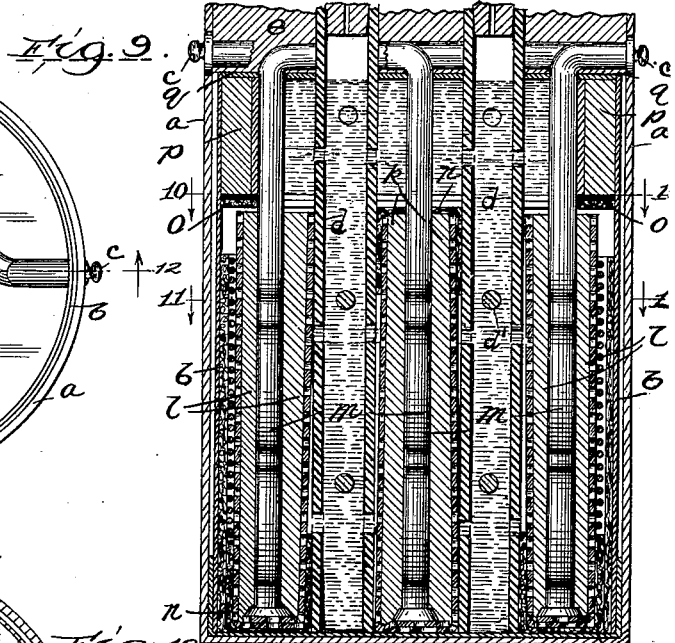
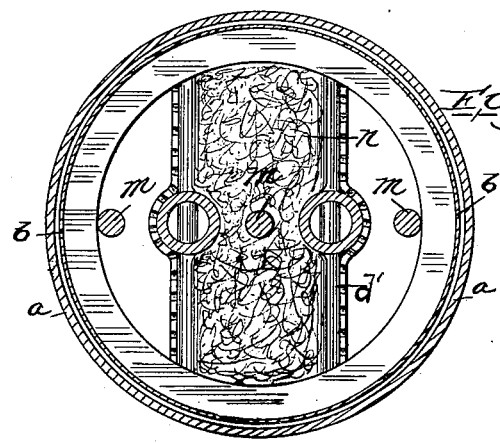
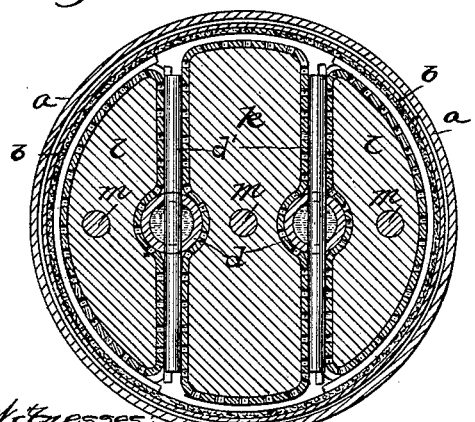
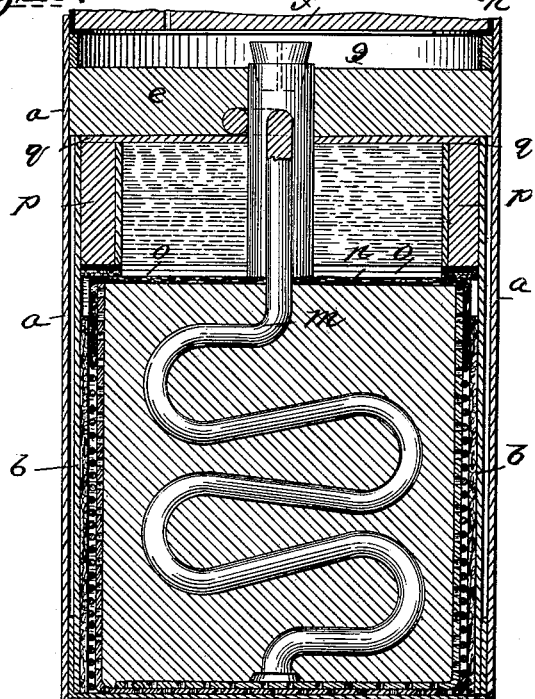
Inventor:
David P. Perry,
By Charles A. Brown & Cragg
Attorneys.
THE NORRIS PETERS CO., PHOTO-LITHO., WASHINGTON, D. C.

UNITED STATES PATENT OFFICE.

DAVID P. PERRY, OF CHICAGO, ILLINOIS.

PORTABLE STORAGE-BATTERY CELL AND CONTAINING-CASE THEREFOR.

SPECIFICATION forming part of Letters Patent No. 650,417, dated May 29, 1900.

Application filed April 28, 1899. Serial No. 714,926. (No model.)

*To all whom it may concern:*

Be it known that I, DAVID P. PERRY, a citizen of the United States, residing at Chicago, in the county of Cook and State of Illinois, have invented a certain new and useful Improvement in Portable Storage-Battery Cells and Containing-Cases Therefor, (Case No. 1,) of which the following is a full, clear, concise, and exact description, reference being had to the accompanying drawings, forming a part of this specification.

My invention relates to portable storage-battery cells and containing-cases therefor, and has for its object the provision of a compact and cleanly cell and package adapted to be moved about without affecting the battery.

The battery-cell and containing-casing of my invention are peculiarly adapted for use in connection with vehicles or bicycles for the purpose of lighting or for furnishing motive power.

It is well known that a battery employed upon vehicles is subjected to the constant vibration of the vehicle, which with ordinary types of battery is sufficient to prevent the proper working of the battery, while involving the loss of battery fluid, from which unpleasant or injurious results follow. A battery for such uses accordingly requires peculiar design and construction, and, furthermore, as the battery-cells are rarely employed singly a compact casing for containing a convenient number of cells is almost a necessity in this class of work. By the construction herein shown and described I have been enabled to overcome difficulties frequently met with in the employment of other types of battery when the same have been put to the use designated.

The embodiment of my invention may be briefly described as consisting of a treated-fiber casing surrounding and generally conforming to a plurality of my improved battery-cells, which casing is provided at the top with an air space or chamber normally sealed by a cover, except for a small opening or vent. The cover is secured in place by means of a clamp-and-hanger device. The contained battery-cells are secured and sealed in position within the casing, each cell being provided with a central positive and surrounding negative plates, the terminals of which are led beneath the sealing material and out of contact with the air laterally to exterior terminals upon the casing. Between the battery-plates are provided perforated tubes for the electrolyte, extending above the sealing mixture, each tube being closed by a perforated stopper. The terminals are of heavy lead wire and are of serpentine form, being secured to the containing metallic casing of the plate at or near the bottom thereof. The battery parts are separated by and securely held in position within the fiber casing of the cell by asbestos packing.

The details of my said invention will be more readily understood by reference to the accompanying drawings, in connection with which drawings I will describe the same, wherein—

Figure 1 is a side view in elevation, showing my improved casing and clamp. Figs. 2 and 3 are vertical sectional views thereof. Fig. 4 is a plan view of the casing and cell tops, showing the connection with the terminals. Figs. 5, 6, and 7 are views showing the preferred form of terminal and connecting part. Fig. 8 is an enlarged plan view of a single battery-cell, also showing the connections. Fig. 9 is a vertical sectional view of the battery-cell. Figs. 10 and 11 are cross-sectional views on lines A A and B B of Fig. 9, and Fig. 12 is a vertical sectional view of the battery-cell at right angles to that of Fig. 9.

The same letters of reference are employed to designate like parts in each of the figures of the drawings.

The containing-casing $a$ is constructed of treated fiber, adapting the same to resist the action of acid. I preferably employ for the fiber casing an excellent quality of strawboard, the fibers of which are suitably treated with a paraffin-rosin compound, which fills the pores and adapts the same for use in a storage battery. The said casing conforms generally in shape to the inserted cells $b$, which are separated by wooden strips filling the interstices. The terminals of the battery-cells are bent over and connected serially, as indicated in Fig. 4, the battery-terminals being carried laterally through the wall of the containing-casing, upon either side of which a ball or knob $c$ is provided. The tubes $d$ of the battery-cells extend some distance above the respective tops of the said cells, and a suitable insulating and sealing mixture is melted and poured over the tops of said cells, which serves hermetically to seal the cells and terminals in position within the casing. A short distance above the top of the sealing mixture e a seat is provided upon the inner walls and near the top of the casing, which is adapted to receive the rubber-faced wooden cover f. The said cover is provided with an opening, but otherwise serves to seal the intermediate chamber g, provided between the cover and the sealing mixture. Each of the tubes d is closed by a cork having a small perforation therein to permit of the escape of gases generated within the several battery-cells.

Screwed upon the exterior of the battery-casing at either side are metallic straps h, which are bent over the cover and are adapted to be secured in position by the split clamp and hanger i. When the latter is inserted in position, as shown in Figs. 1 and 3, the inclined portions of the straps h are engaged with the upper portion of the wooden cover f, and the same is forced firmly against the seat provided within the battery-casing. The terminal-knobs c are adapted to be engaged by spring-washers j, (shown in Figs. 5 and 6,) which are provided with spring-segments adapted to engage the respective knobs and effect electrical connection with the associated lamp or other translating device connected at X, Fig. 3.

My improved and preferred form of portable storage-battery cell is shown in the remaining figures of the drawings, the views thereof being enlarged and illustrating a single cell within its casing. The manner of sealing the cell within its containing-casing a and of bringing out the terminals beneath the layer of sealing compound is identical with that previously described, the details being shown more fully in Figs. 8 and 9. In this cell the central plate k is the positive and the outer plates l are the negative electrodes of the battery. Between the said plates are disposed the insulating-tubes d, having laterally-extending arms or pins d', which assist in maintaining the plates in their relative positions. The tubes d are adapted to receive the sulfuric acid and are perforated at intervals throughout their length to permit the electrolyte to reach the plates of the battery. Said plates are constructed of perforated rolled sheet-lead, which sheets are formed to receive the oxid, as shown in Fig. 11, and fit closely within the inner wall of the cell. A heavy lead terminal m extends from the top of the cell to the bottom of the plate, where it is fused or soldered to the body of the metal, that portion of the terminal beneath the oxid which is filled into the plate and thoroughly tamped down being given a serpentine form, as shown in Fig. 12. The complete tubes and plates having been assembled, the positive and negative plates are separated by means of sheet-asbestos n, which is wrapped about the top of the positive and the bottoms of the negative plates. All are then bound together by means of wrappings of asbestos twine and are placed within the inner cell, which is then closely packed with asbestos nearly to the tops of the plates. This asbestos packing and wrapping not only serves as an insulator, but prevents the several parts of the battery-cell from becoming loose or having relative movement, which is highly important in a portable battery. Moreover, a cell constructed in this manner permits of the expansion of the plates under the influence of the electric current without damage to the cells, since the asbestos becomes somewhat softened and spongy when immersed in the sulfuric acid and accordingly subserves this purpose in an admirable manner. To this same end the terminals m are given a serpentine form, which permits of considerable self-adjustment on the part of the plate without endangering its connection with the terminal-knob. The cross-section of wire m is purposely made of considerable size in order to secure an increased exposure of surface and also prevents the wire from becoming quickly deteriorated and impairing or breaking the connection. Two annular washers o, of asbestos and rubber, are disposed above the tops of the plates, and a short fiber cylinder p is placed thereon. A perforated fiber lid q, adapted to receive the ends of terminal-wires m and tubes d, is then placed over the top of the inner cell and wall p. Perforated corks are inserted in the tops of tubes d. The terminal-wires are treated to prevent the creeping of acid and are bent over, as already described, the negative plates being connected, as clearly shown in Fig. 8, and the terminals are led laterally to knobs c, provided upon the casing. A melted sealing mixture is then poured over the top of the cell, which upon hardening serves hermetically to seal the same. The corks being removed from tubes d, said tubes and cell are filled with sulfuric acid, the corks are replaced, and the battery is connected in an electric circuit and charged in a manner well known to those skilled in the art. The single cell when constructed in this manner is provided with an intermediate chamber g and a tightly-fitting cover f, resting upon a seat provided in the outer casing a. A single cell or group of cells when constructed in the manner shown and described will be found to be extremely efficient, cleanly, and capable of being subjected to hard usage and constant transportation. A relatively-small body of acid in the cell is sealed in position, minute vents being provided for the escape of gases generated within the cell, the vents, however, communicating with a closed intermediate chamber which is adapted to permit the gradual dissipation of the gases through its vent, while retaining any small portion of the acid that escapes through frothing or is carried out by the generated gas. The terminal-wires $m$ being maintained wholly out of contact with the air, since they are hermetically sealed beneath the sealing mixture $e$, are not liable to be eaten off or become deteriorated, which obviates a frequent objection made against storage batteries.

Various modifications may be made in the improvements herein shown and described without departing from the spirit of my invention; but, Having shown and described apparatus embodying my invention, I claim as new, and desire to secure by these Letters Patent, together with all such modifications as may be made by mere skill, the following:

1. The combination with a plurality of battery-cells $b$, of a containing-casing $a$ formed of treated fiber and conforming generally to the shape of the battery-cells, terminal-wires extending laterally to terminal parts $c$ provided upon the sides of the casing, a sealing material covering the tops of the battery cells and terminals, and a tightly-fitting perforated cover $f$ disposed within the said casing, between which and the tops of the battery-cells is provided an intermediate chamber, substantially as and for the purpose described.

2. In a battery of the class described, the combination with the plates $k\ l$, of a sealing mixture applied to the top of the battery, terminal parts, and terminal-wires $m$ connected with said plates and extending laterally beneath said sealing mixture to said terminal parts, whereby the wires are hermetically inclosed and protected, substantially as described.

3. In a battery-cell of the class described, the combination with plates $k\ l$, of tubes $d$ extending approximately to the bottom of the cell adapted to contain the fluid electrolyte, conductors or wires $m$ connected with the said plates and forming the terminals of the cell, and a sealing mixture $e$ disposed upon the top of the cell, covering the said conductors and hermetically sealing the cell, substantially as described.

4. In a battery-cell of the class described, the combination with plates $k\ l$, of perforated tubes $d$ interposed between the said plates and adapted to contain the electrolyte, a packing material inserted in the cell and adapted to maintain the several parts in position, and a sealing mixture disposed at the top of the cell covering the terminals and surrounding the tubes, substantially as described.

5. In a battery-cell of the class described, the combination with plates $k\ l$, of perforated tubes $d$ interposed between the said plates and adapted to contain the electrolyte, a packing material inserted in the cell and adapted to maintain the several parts in position, a sealing mixture disposed at the top of the cell covering the terminals and surrounding the tubes, and an intermediate chamber provided at the top of the cell communicating with the tube adapted to receive the escaping gases and liquid, substantially as described.

In witness whereof I hereunto subscribe my name this 18th day of April, A. D. 1899.

DAVID P. PERRY.

Witnesses:
GEORGE L. CRAGG,
CHARLES E. HUBERT.